Patented June 20, 1944

2,351,674

UNITED STATES PATENT OFFICE 2,351,674

PROCESS OF PRODUCING SULPHONYL CHLORIDES

Arthur Lawrence Fox, Easton, Pa., assignor to E. I. du Pont de Nemours & Company, Wilmington, Del., a corporation of Delaware No Drawing. Application March 11, 1943, Serial No. 478,834

5 Claims. (Cl. 204—162)

This invention relates to new chemical compounds and processes and more particularly to alkyl substituted aromatic compounds which contain an exo-sulphonyl chloride group or an exo-sulphonate group.

This application is a continuation in part of my copending application, Ser. No. 360,602, filed October 10, 1940, which became U. S. Patent No. 2,321,022 on June 8, 1943.

This invention has as an object the preparation of new surface active compounds and intermediates therefor. A further object is to prepare these new compounds by a novel and easily conducted process which gives good yields of relatively high quality products. A still further object is to employ these new compounds in various technical applications. Other objects will appear hereinafter.

These objects are accomplished by the following invention in accordance with which new alkyl substituted aromatic compounds which contain an exo-sulphonyl chloride group or an exo-sulphonyl group are produced. In these new compounds there is present an alkyl group which contains at least 5 carbon atoms. The preferred compounds of this invention are those in which an alkyl group contains 10 or more carbon atoms or at least two alkyl groups each contain 5 or more carbon atoms. These preferred compounds exhibit much greater surface activity than compounds which contain a total of less than 10 carbon atoms in the alkyl substituent or substituents. The aromatic portion of these compounds is preferably an aromatic hydrocarbon nucleus and more especially an aromatic hydrocarbon nucleus of the benzene and naphthalene series. The exo-sulphonate group in these new comopounds has the general formula

—SO₃M in which M stands for a cation such as hydrogen or sodium.

The new compounds of this invention are prepared by reacting alkyl substituted aromatic compounds containing at least 5 carbon atoms in an alkyl chain with sulphuryl chloride in the presence of actinic light and a catalyst. The action of sulphuryl chloride will produce a mixture of compounds containing sulphonyl chloride groups in the side chain. The yields depend somewhat on the length of the side chain, the longer the alkyl chain the greater being the yields under normal circumstances.

Products of this type or those derived therefrom are useful in many of the arts, for example, for producing textile assistants, such as wetting agents, detergents, softening agents, waterproofing agents and the like, and they are also of interest for the production of dyestuff intermediates, such as are obtained by nitration of the aromatic nucleus followed by reduction of the nitro group. This process offers a practical method of obtaining exo-sulphonated alkyl aromatic hydrocarbons in good yields.

The term "exo" as used in this application is employed in the sense that it is used in the second edition of Webster's New International Dictionary to denote a group which is in the side chain and not in the ring of an alkyl aromatic compound.

The following example illustrates but does not limit this invention. All parts are given by weight.

*Example—Triamyl benzene exo-sodium sulphonate*

144 parts of triamyl-benzene and 100 parts of benzene were mixed and warmed to 50-55° C. in the presence of actinic light from a tungsten filament lamp. Then one part of pyridine was added and 75 parts of sulphuryl chloride was gradually introduced over a period of 50 minutes. After maintaining the temperature another 1.5 hours at 50-55° C., one part of pyridine was added and the reaction mass maintained at 50-55° C. for 16 hours. Then another part of pyridine was added and the reaction continued 6 hours more. The benzene and unreacted sulphuryl chloride were removed at 70-80° C. under vacuum, and 175 parts of a red brown oil was obtained. On hydrolysis with sodium hydroxide this gave triamylbenzene exo-sodium sulphonate which showed excellent soft water detergency, moderate hard water detergency, and gave a wetting speed of 25 seconds at a concentration of 1 gram active ingredient per liter when tested by the method of Draves and Clarkson which is described in American Dyestuffs Reporter 20, 201 (1931).

The temperature at which the reaction is run may vary widely. The reaction is usually carried out at temperatures at which all reactants are liquid. The temperature should not be sufficiently low to cause freezing of the reactants or high enough to cause decomposition of the sulphonyl chlorides which are being formed. The preferred temperature range is 20° to 80° C.

In accordance with the procedure exemplified in the preceding example other alkyl substituted aromatic compounds containing at least 5 carbon atoms in an alkyl chain may be reacted with sulphuryl chloride to produce alkyl substituted aromatic compounds that contain an exo-sulphonyl chloride group or an exo-sulphonate group. Among the alkyl substituted aromatic compounds that may be reacted with sulphuryl chloride in accordance with this invention there may be mentioned hexyl benzene, octyl benzene, decyl benzene, decyl xylene, dodecyl benzene, tridecyl benzene, hexadecyl benzene, octyl naphthalene, decyl naphthalene, dodecyl naphthalene, etc. Mixtures of alkylated compounds such as may be obtained by condensing chlorinated kerosenes or white oils with aromatic hydrocarbons, such as benzene, toluene, or naphthalene, by means of a Friedel-Crafts reaction may also be converted to compounds containing an exo-sulphonyl chloride group or an exosulphonate group in accordance with this invention. Polyalkylated aromatic compounds such as triamyl benzene, tetraamyl benzene, dioctyl benzene, didecyl benzene, didodecyl benzene, ditridecyl benzene, diamyl naphthalene, triamyl naphthalene, dioctyl naphthalene, didodecyl naphthalene, etc., are also contemplated reactants for use in the present invention.

Other aromatic nuclei than benzene and naphthalene are also contemplated. Thus, alkyl anthracenes, alkyl phenanthrenes, alkyl carbazoles, etc. may be converted to exo-sulphonates in this manner. Furthermore, the aromatic nucleus may contain substituents which themselves do not react with sulphuryl chloride, and hence compounds such as alkyl chlorobenzenes, alkyl benzoic acids, alkyl anthraquinones and alkyl nitro naphthalenes may also be used. It is to be understood that the alkyl compounds mentioned in this paragraph all contain at least one alkyl group having 5 or more carbon atoms.

In the example the use of actinic light from a tungsten filament lamp has been specified. This is merely because it offers a convenient source of actinic light and not because it produces a predominant quantity of the effective wave length. Other sources of actinic light such as mercury arc, carbon arc, neon lights, fluorescent lights, direct or diffused sunlight or any other source providing wave lengths promoting this reaction may be used. Some of these light sources are superior to tungsten filament lamps.

In addition to light it is preferable to use a catalyst such as pyridine. In place of pyridine, I may use other heterocyclic compounds containing nitrogen in the ring such as quinoline, quinaldine, nicotine, alpha-aminopyridine 2,6-diaminopyridine, phenanthroline, piperidine, isoquinoline, nicotinic amide, morpholine, pyridinium acethydrazide, 2-mercaptothiazoline, etc. The reaction may also be catalyzed by using still other compounds in place of or in addition to a heterocyclic compound containing nitrogen in the ring. Other compounds which are known to catalyze this reaction include sulphur dioxide, thionyl chloride, sulphur, chlorine, carbon monoxide, dimethylaniline, m-nitrodimethylaniline, isoamylamine, tributylamine, N-dimethyl cyclohexylamine, ethylenediamine, octadecylamine, hexamethylenediamine, uns.-dimethylethylenediamine, N,N,N',N'-tetramethylhexamethylenediamine, N-dimethyl - C - dimethylglycinenitrile, tetramethylammoniumformate, N,N'-disalicylaldiaminoethane, N-(2-ethylhexanylidine)-2-ethylhexylamine, 2 - amino - 2 - methylpropanol - 1, dodecyl carbamate, butyrolactam, xylylheptadecylketoxime, hexamethylenediisocyanate, methallylisothiocyanate, acetamide, N-dimethylmethoxyacetamide, lauramide, isobutylundecylenamide, N-(p-methoxybenzyl)lauramide, stearyldimethylamineoxide, (trimethylaminoethylstearate) methyl sulphate, allylthiourea, tetramethyl thiuram disulphide, tetramethyl thiuram monosulphide, thiophenol, triphenylphosphine, phenylethyleneoxide, and potassium anthraquinone-1-sulphonate.

Instead of using sodium hydroxide to hydrolyze the sulphonyl chlorides I may employ aqueous solutions of potassium hydroxide, sodium carbonate, potassium acetate, ammonium hydroxide, quaternary ammonium hydroxides, methylamine, dimethyl amine, trimethyl amine, ethanol amine, diethanol amine, triethanol amine, diethanol aniline, pyridine, piperidine, or other similar alkaline reacting compounds.

The above description and example are intended to be illustrative only and not to limit the scope of the invention. Any departure therefrom which conforms to the spirit of the invention is intended to be included within the scope of the appended claims.

I claim:

1. A process of making an alkyl substituted aromatic compound which contains an exo-sulphonyl chloride group which comprises reacting an alkyl substituted aromatic compound wherein an alkyl group contains at least 5 carbon atoms with sulphuryl chloride in the presence of actinic light and a heterocyclic compound containing nitrogen in the ring.

2. A process as defined in claim 1 according to which the exo-sulphonyl chloride group is converted by hydrolysis to an exo-sulphonate group.

3. A process of making an alkyl substituted aromatic hydrocarbon of the benzene and naphthalene series which contains an exocyclic sulphonyl chloride group which comprises reacting an alkyl substituted aromatic hydrocarbon of the benzene and naphthalene series wherein an alkyl group contains at least 5 carbon atoms with sulphuryl chloride in the presence of actinic light and a heterocyclic compound containing nitrogen in the ring.

4. A process as defined in claim 3 in which the alkyl substituted aromatic hydrocarbon is triamyl benzene.

5. A process as defined in claim 3 in which the heterocyclic compound is pyridine.

ARTHUR LAWRENCE FOX.

CERTIFICATE OF CORRECTION.

Patent No. 2,351,674.   June 20, 1944.

ARTHUR LAWRENCE FOX.

It is hereby certified that error appears in the printed specification of the above numbered patent requiring correction as follows: Page 1, first column, line 23, for "exo-sulphonyl" read --exo-sulphonate--; and that the said Letters Patent should be read with this correction therein that the same may conform to the record of the case in the Patent Office.

Signed and sealed this 8th day of August, A. D. 1944.

(Seal)

Leslie Frazer
Acting Commissioner of Patents.

CERTIFICATE OF CORRECTION.

Patent No. 2,351,674.

June 20, 1944.

ARTHUR LAWRENCE FOX.

It is hereby certified that error appears in the printed specification of the above numbered patent requiring correction as follows: Page 1, first column, line 23, for "exo-sulphonyl" read --exo-sulphonate--; and that the said Letters Patent should be read with this correction therein that the same may conform to the record of the case in the Patent Office.

Signed and sealed this 8th day of August, A. D. 1944.

(Seal)

Leslie Frazer

Acting Commissioner of Patents.